(12) United States Patent
Miles (10) Patent No.: US 9,828,042 B2
(45) Date of Patent: Nov. 28, 2017

(54) UNIVERSAL TAILGATE LATCH AND SUPPORT

(71) Applicant: Frank Anthony Miles, Newnan, GA (US)

(72) Inventor: Frank Anthony Miles, Newnan, GA (US)

( * ) Notice: Subject to any disclaimer, the term of this patent is extended or adjusted under 35 U.S.C. 154(b) by 318 days.

(21) Appl. No.: 14/678,985

(22) Filed: Apr. 5, 2015

(65) Prior Publication Data

US 2015/0284036 A1    Oct. 8, 2015

Related U.S. Application Data

(60) Provisional application No. 61/995,294, filed on Apr. 7, 2014.

(51) Int. Cl.
| | |
|---|---|
| *B62D 33/03* | (2006.01) |
| *B62D 33/037* | (2006.01) |
| *B62D 33/027* | (2006.01) |
| *E05B 83/16* | (2014.01) |
| *E05C 17/36* | (2006.01) |

(52) U.S. Cl.
CPC ....... *B62D 33/037* (2013.01); *B62D 33/0273* (2013.01); *E05B 83/16* (2013.01); *E05C 17/36* (2013.01); *Y10T 292/62* (2015.04)

(58) Field of Classification Search
CPC .... B62D 33/0273; B62D 33/037; E05C 17/36
USPC ......................................................... 296/57.1
See application file for complete search history.

(56) References Cited

U.S. PATENT DOCUMENTS

| | | | |
|---|---|---|---|
| 2,955,863 A | | 10/1960 | Olander |
| 4,813,842 A | * | 3/1989 | Morton .................. A01D 90/00 292/DIG. 29 |
| D370,453 S | * | 6/1996 | Shortman ..................... D12/223 |
| 5,707,095 A | | 1/1998 | Pribak |
| 6,793,264 B1 | * | 9/2004 | Muller .................. E05F 1/1091 16/71 |
| 7,258,373 B2 | | 8/2007 | Plett |
| 2017/0009508 A1 | * | 1/2017 | Hunt .................. B62D 33/0273 |

* cited by examiner

*Primary Examiner* — Jason S Morrow (57) ABSTRACT

A universal tailgate latch and support system for receiving a commonly available latching mechanism. The latch housing secures the latch to the side of a vehicle cargo bed and allows the cargo door to be supported with a cable or the like when open and secured when closed. The housing may be modified to fit a variety of latches and lends itself to restoring a variety of new or vintage truck beds.

4 Claims, 7 Drawing Sheets

UNIVERSAL TAILGATE LATCH AND SUPPORT

CROSS REFERENCE TO RELATED APPLICATIONS

This application claims the benefit of provisional patent application Ser. No. 61/995,294, Filed 2014 Apr. 7 by the present inventor.

FEDERALLY SPONSORED RESEARCH

Not Applicable

SEQUENCE LISTING OR PROGRAM

Not Applicable

BACKGROUND

Field

This invention relates to latches and supporting members for securing and supporting doors or gates, specifically latches used to secure the tailgates of trucks in a closed position and members to support open tailgates of trucks.

Prior Art

The truck market is in a constant state of flux. Most manufacturers of trucks and truck beds have changed their styles to meet the needs of the average consumer. The people that want to bring back early model trucks have had to adapt to the change. One change in particular is the latching mechanism on truck tailgates. Most of the step-side pickup truck beds relied on a chain to secure the tailgate to the bed of the truck, this was done by most manufacturers until the late 1980s. The chain offered support for the tailgate when it was parallel to the bed of the truck. When the gate was closed, in most cases, the chain was hooked to the bed of the truck to secure it in place. If the chain was outside the bed of the truck, the chain would rub against the body of the truck as it went down the road. For many people attempting to restore vintage trucks, this meant the chain would rub against a custom paint job that required a lot of money to restore. U.S. Pat. No. 2,955,863 to Olender (1960) illustrates one such chain with a covering over it. Although this covering would protect the finish of the truck, it is visible, which is typically not desired by truck enthusiasts. Furthermore, the latching mechanism is on the visible, outer side of the tailgate.

U.S. Pat. No. 5,707,095 to Pribak (1998) teaches a latching and support mechanism that although hidden when the tailgate is closed, makes it difficult to mount on a wide variety of aftermarket tailgates when different styles of beds and gates are involved. U.S. Pat. No. 7,258,373 to Plett (2007) offers a very functional latching mechanism that is best installed by the truck manufacturer before the tailgate is fully assembled.

Additionally, the original manufacturer of the truck beds typically phases out the stocking of replacement body and bed parts. This is especially true of those required on trucks from the mid twentieth century.

SUMMARY OF THE INVENTION

A universal tailgate latch and support system, according to one embodiment, is furnished in a kit to be installed by a person restoring a vintage truck bed. The latch kit is designed to be used on a variety of custom truck beds and tailgates. The latch kits consist of a left and right hand set of components further comprising a housing, a flexible tailgate support, a latch mechanism, a latch bolt, and hardware to fasten it to a restored truck bed. Holes are transferred from a template to the inside walls of the bed and the inside surface of the tailgate. Holes are drilled by the installer and the assembly is mounted to the truck bed.

A second embodiment of the present invention utilizes main components of the bolt on kit, but lacks some hardware if the installer chooses to weld the mounting plates to the truck bed and tailgate. Welding of components is sometimes preferred for its cleaner appearance, but relies on the skill of the person restoring the truck.

DRAWINGS—REFERENCE NUMERALS

1 Truck Bed
2 Left Hand Latch and Support Assembly
3 Right Hand Latch and Support Assembly
4 Tailgate
5 Latch
6A Left Hand Latch Housing
6B Right Hand Latch Housing
7A Left Hand Housing Backing Plate
7B Right Hand Housing Backing Plate
8A Left Hand Tailgate Latch Bolt Bracket
8B Right Hand Tailgate Latch Bolt Bracket
9 Latch Bolt Backing Plate
10 Threaded Nut Plate
11 Adjustable Cable End Clamp
12 Clamp Backing Plate
13 Cable End Guard
14 Support Cable
15 Latch Bolt
16 Hardware
17 Stake Pocket
18 Closed End Cable Bolt 19 Shoulder Bolt
20 Clamp Pivot Stopping Tab
21 Latch Housing Mounting Holes
22 Latch Bolt Bracket Mounting Holes

DETAILED DESCRIPTION

Figure 1:
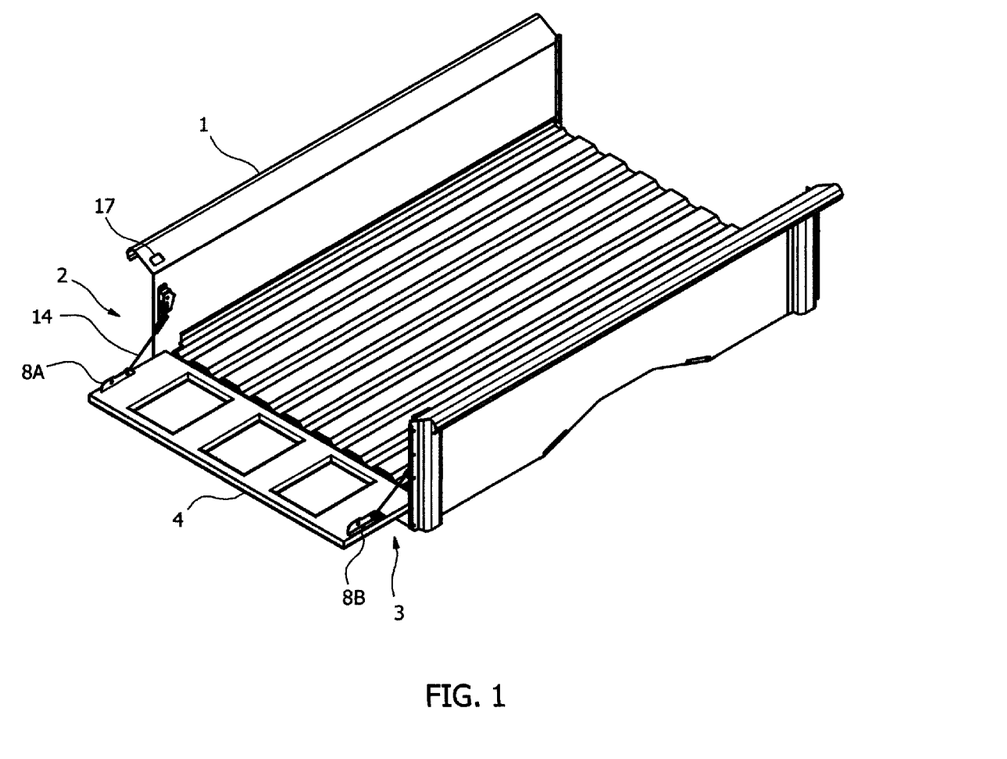
FIG. 1 is an isometric view of a truck bed with right and left hand latch and support kits installed in accordance with one embodiment.
Figure 2:
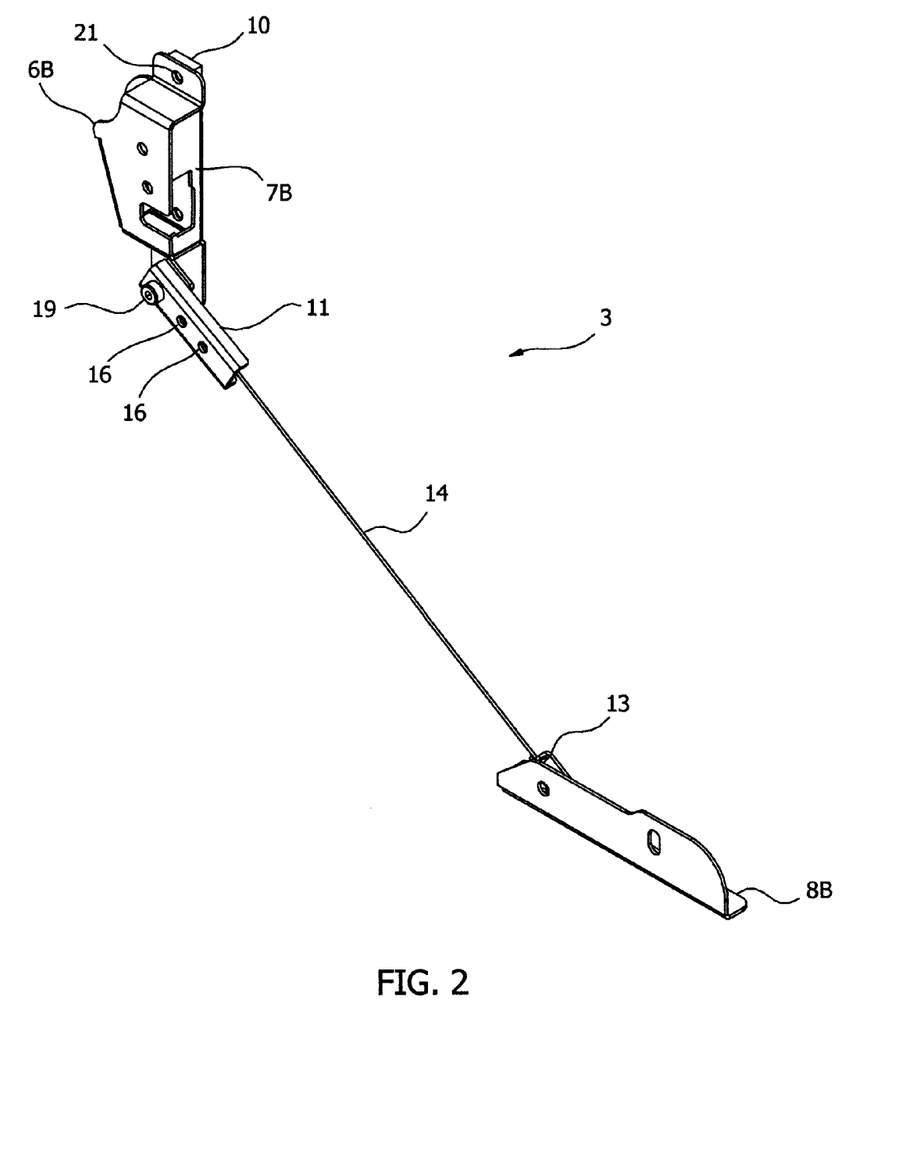
FIG. 2 is an isometric view of the right hand kit assembled with some of the hardware removed in accordance with one embodiment.
Figure 3:
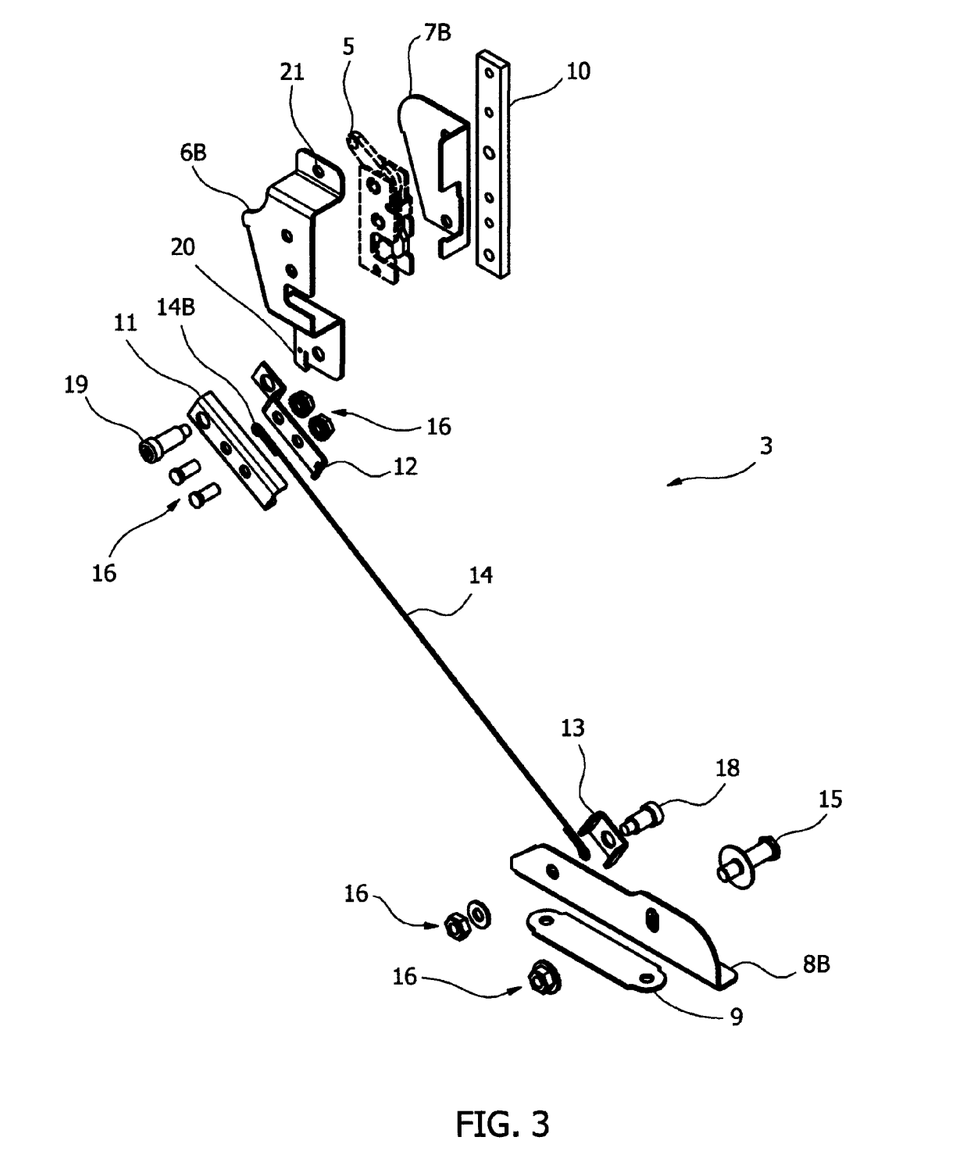
FIG. 3 is an exploded view of a right hand latch and support assembly in accordance with one embodiment. This view shows additional hardware for sandwiching portions of the truck bed and tailgate.

According to one embodiment, the universal tailgate latch and support system is furnished in a kit to be assembled and installed by the person restoring a vintage truck bed 1. The latch kits are supplied as a left hand 2 and right hand 3 assembly. The housings 6A and 6B are meant to secure a commonly available rotary style latch 5, also known as a bear claw latch, to the side of the bed 1. If the latch and support kit will be fastened to the truck body with threaded fasteners, the following procedure is used. A template is provided to transfer bolt holes to the side of the bed 1 and the tailgate 4. The kit consists of right and left latch housings 6A and 6B, latch housing backing plates 7A and 7B, two rotary style latches 5, tailgate latch bolt brackets 8A and 8B, two latch bolt bracket backing plates 9, two threaded nut plates 10, two adjustable cable end clamps 11, two clamp backing plates 12, two cable end guards 13, two tailgate support cables 14, two latch bolts 15, and mounting hardware 16.

To install the universal tailgate latch and support mentioned above, lay the hole template on the inside side panel of the truck bed 1. Mark and drill the clearance holes to mount the latch housing 6A or 6B to the bed side panel and the holes to mount the tailgate bracket 8A or 8B to the tailgate 4. A nut plate 10 inserted in the side stake pocket 17 with threaded holes allows for blind attachment of the housing 6A or 6B with bolts through the side of the bed 1. The use of the nut plate 10 allows for fastening without the use of a second wrench. The latch housing backing plate 7A or 7B is fastened to the side of the truck bed 1 with the nut plate 10. The rotary style latch 5 is attached to the inside of the latch housing 6A or 6B. The latch housing 6A or 6B is then fastened to the side of the truck bed 1.

Figure 5:
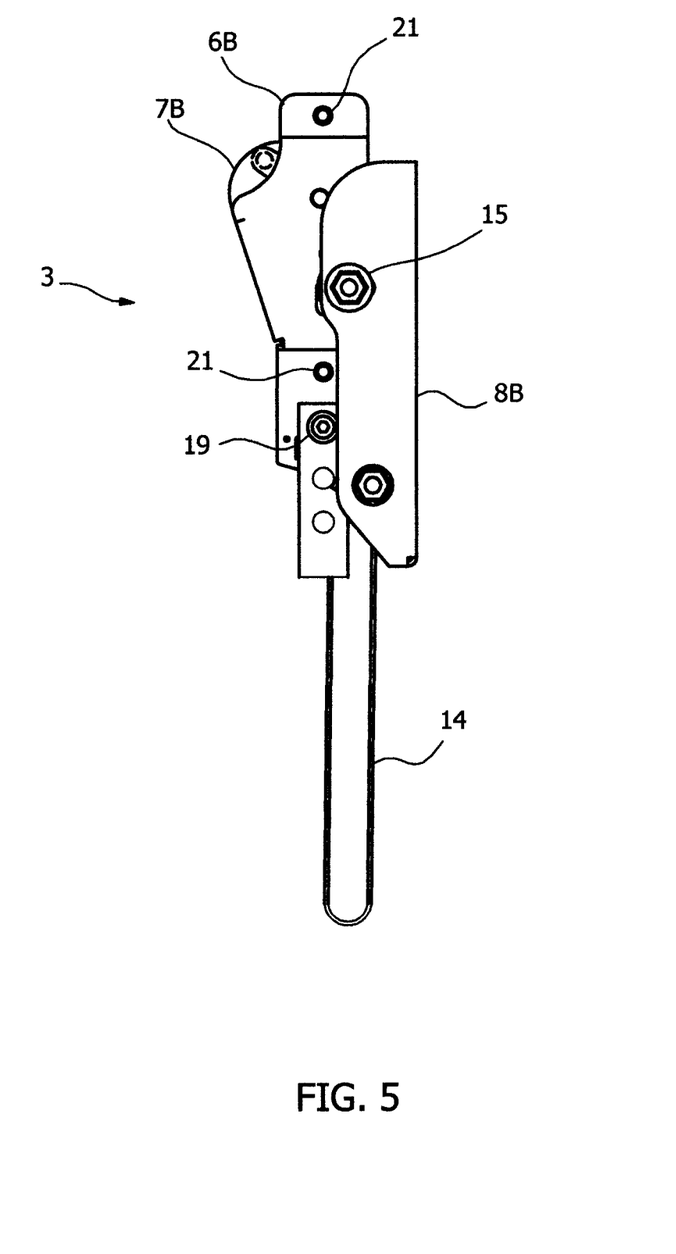
FIG. 5 is a side view of a right hand latch and support assembly in its closed position in accordance with one embodiment.

The tailgate latch bolt bracket 8A or 8B is attached to the inside of the tailgate 4. This bracket 8A or 8B holds the latch bolt 15 that is captured by the latch 5 when the tailgate 4 is closed. The support cable 14 is supplied with a formed loop 14A on one end with the other end 14B open to allow for final adjustment. The closed loop 14A is typically attached to the latch bolt bracket 8A or 8B first with a bolt 18 and a clamp end guard 13. With the tailgate 4 at the desired open position, the support cable 14 is trimmed to length and a second loop 14B is formed to be attached to the adjustable cable end clamp 11 and clamp backing plate 12. The adjustable cable end clamp 11 holding the support cable 14 is allowed to pivot during movement of the tailgate 4 with a shoulder bolt 19. A clamp pivot stopping tab 20 is provided to allow the installer to bend it away from the sides of the truck bed to prevent the cable end clamp 11 and clamp backing plate 12 from pivoting too far back into the bed area during tailgate closure.

Figure 4:
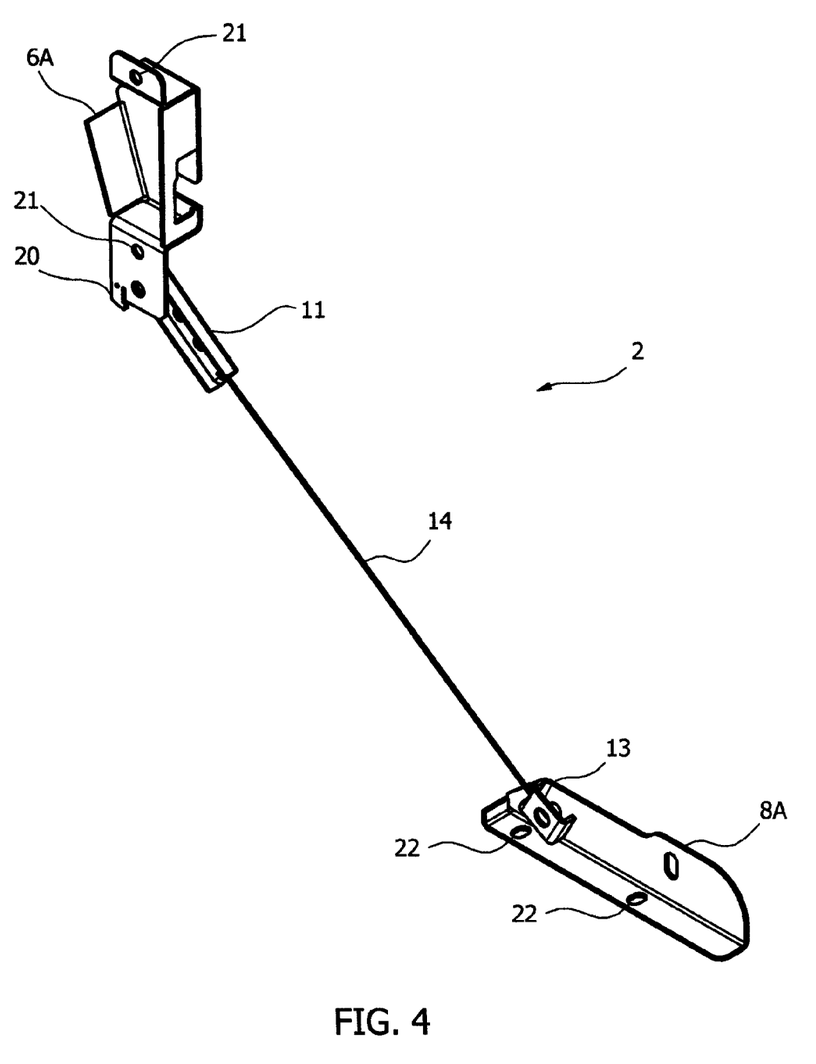
FIG. 4 is a simplified view of a left hand latch and support assembly in accordance with one embodiment.

The above procedure is then repeated for the other side of the tailgate 4. With the exception of the latch housings 6A and 6B, latch housing backing plates 7A and 7B, and latch bolt brackets 8A and 8B, the component parts of the left hand latch and support assembly 2 is similar to the right hand assembly 3.

Figure 6:
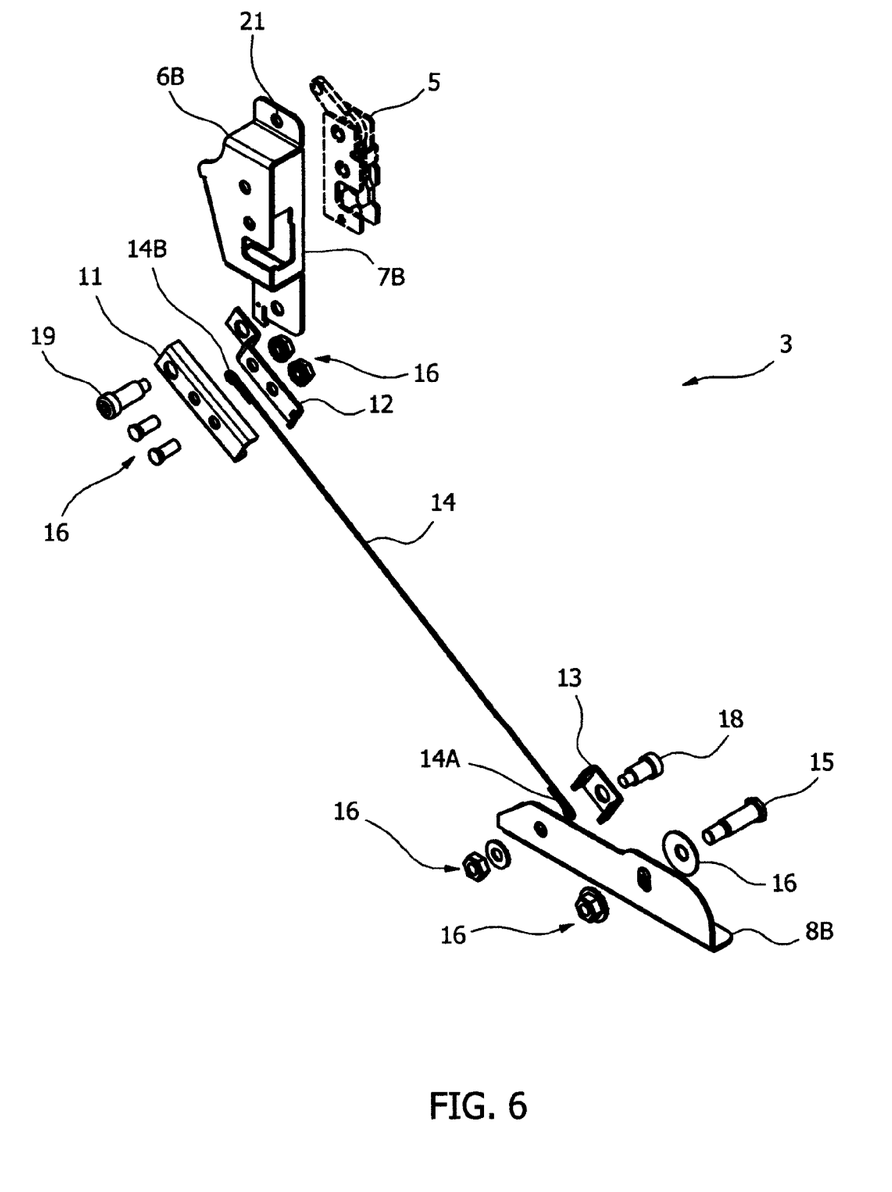
FIG. 6 is an exploded view of a right hand latch and support assembly for use in a welded application in accordance with one embodiment. This assembly is for use when the installer wishes to weld the housing and brackets directly to the truck bed and tailgate rather than bolting them on. This installation may produce a cleaner appearance since it removes some of the hardware but it is also more difficult to install.
Figure 7:
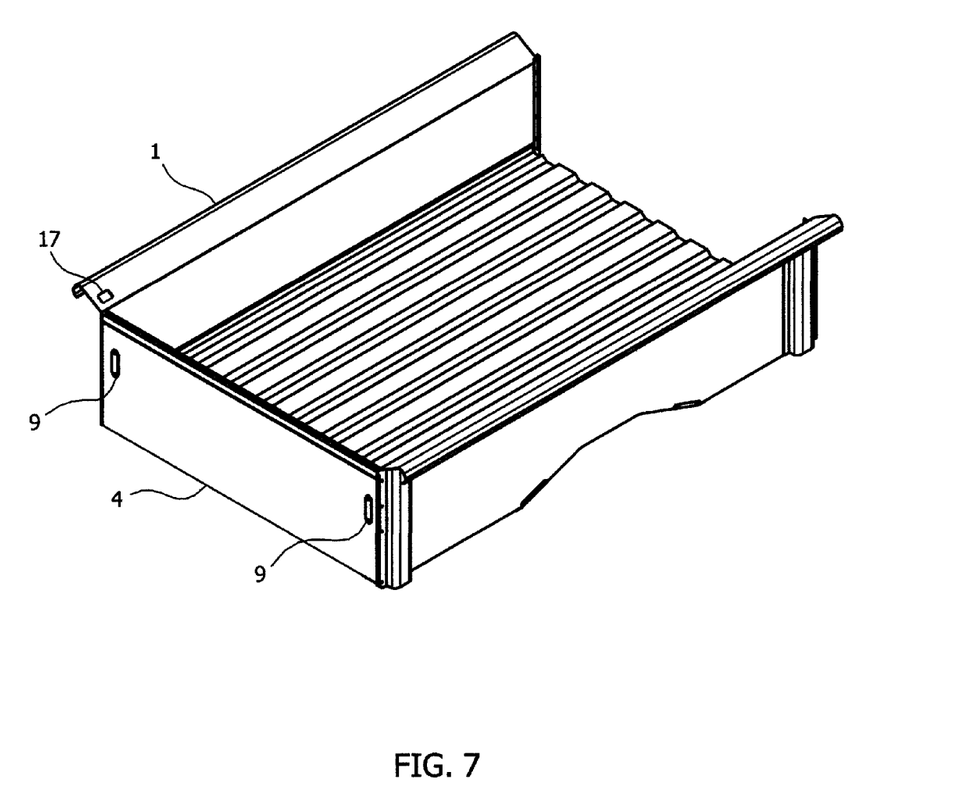
FIG. 7 is an isometric view of a truck bed with the tailgate in a closed position in accordance with one embodiment.

If the installer prefers to weld the assembly rather than using threaded fasteners, a "weld-on" kit may be used. This kit would be similar in form to the above kit but would be supplied without mounting holes 21 in the latch housings 6A and 6B and would also be without the backing plate 9 and the corresponding holes 22 in the latch bolt brackets 8A and 8B. The nut plate 10 would also be eliminated.

Although the bolted and weld-on embodiments are shown in great detail in the above description, these details should not be construed as to limit the scope of the embodiments. The above description is to illustrate the present preferred construction of the latch and support assembly. Different fasteners and shape configurations of the latch housing and brackets may be used, for example, to secure hinged cargo gates to vehicle cargo panels. The scope of the embodiments should be determined by the following claims rather than the examples given.

The invention claimed is:

1. A vehicle door latch housing and supporting assembly comprising:
   a. a u-shaped outer housing including an outer face having a plurality of mounting holes for a mounting a latch mechanism and a cutout for receiving a latching bolt, two attached side faces substantially perpendicular to said outer face, and two attached coplanar mounting flanges parallel to said outer face with at least one hole in each said flange,
   b. an L-shaped housing backing plate including a back face mounted in the same plane as said housing mounting flanges having mounting holes concentric to said mounting holes of said housing outer face and an attached end plate perpendicular to said backing plate back face having a cutout for receiving said latch bolt,
   c. a nut plate substantially invisibly mounted to said outer housing flanges having threaded holes for receiving threaded fasteners that sandwich the side panel of a vehicle cargo bed between said nut plate and said housing mounting flanges,
   d. a u-shaped cable outer clamp having two parallel sides and a connecting face, said connecting face further having a mounting hole for receiving a cylindrical fastener to pivotably mount said cable outer clamp to the bottom of one of said housing mounting flanges,
   e. a flexible supporting cable,
   f. an upper cable inner clamp for sandwiching said flexible cable between said upper cable inner clamp and said cable outer clamp connecting face, said upper cable inner clamp having at least one fastener hole to clamp said upper end of said flexible supporting cable to said cable outer clamp,
   g. a lower cable inner clamp,
   h. an L-shaped gate bracket having a first face parallel to said side of a vehicle cargo bed further having at least one hole for securing said lower cable inner clamp and one hole for receiving said latch bolt and a second face perpendicular to said gate bracket first face mounted parallel to the inner surface of a vehicle cargo door further having a plurality of holes for securing said gate bracket to said cargo door,
   i. a fastening plate mounted to the outside of said vehicle cargo door having mounting holes concentric with said holes in said second face of said gate bracket,
   whereby said vehicle door latch housing and supporting assembly secures said latch bolt in said latch housing when said vehicle door is closed and supports said vehicle door with said flexible supporting cable when said vehicle door is open.

2. The u-shaped outer housing of claim 1 wherein the said lower flange of said outer housing contains a tab that is bent perpendicular to said lower flange to partially restrict the rotation of said cable outer clamp.

3. A vehicle door latch housing and supporting assembly comprising:
   a. a u-shaped outer housing including an outer face having a plurality of mounting holes for a mounting a latch mechanism and a cutout for receiving a latching bolt, two attached side faces substantially perpendicular to said outer face, and two attached coplanar mounting flanges parallel to said outer face,
   b. a side housing plate affixed perpendicular to said outer housing outer face having a cutout for receiving said latch bolt,
   c. a u-shaped cable outer clamp having two parallel sides and a connecting face, said connecting face further having a mounting hole for receiving a cylindrical fastener to pivotably mount said cable outer clamp to the bottom of one of said housing mounting flanges,
   d. a flexible supporting cable,
   e. an upper member cable inner clamp for sandwiching said flexible supporting cable between said upper cable inner clamp and said cable outer clamp connecting face, said upper cable inner clamp having at least one fastener hole to clamp said upper end of said flexible supporting cable to said cable outer clamp,
   f. a lower cable inner clamp,
   g. an L-shaped gate bracket having a first face parallel to said side of a vehicle cargo bed further having at least one hole for securing said lower cable inner clamp and one hole for receiving said latch bolt and a second face perpendicular to said gate bracket first face mounted parallel to the inner surface of a vehicle cargo door,
whereby said vehicle door latch housing and supporting assembly secures said latch bolt in said latch housing when said vehicle door is closed and supports said vehicle door with said flexible supporting cable when said vehicle door is open.

4. The u-shaped outer housing of claim 1 wherein the said lower flange of said outer housing contains a tab that is bent perpendicular to said lower flange to partially restrict the rotation of said cable outer clamp.

* * * * *